United States Patent [19]
Hinkle

[11] Patent Number: 5,868,412
[45] Date of Patent: Feb. 9, 1999

[54] STAIRWAY FOR FLATBED VEHICLES

[76] Inventor: Wilbert Hinkle, P.O. Box 2499, Gary, Ind. 46403

[21] Appl. No.: 656,659

[22] Filed: May 31, 1996

Related U.S. Application Data

[60] Provisional application No. 60/011,230 Feb. 6, 1996.
[51] Int. Cl.⁶ ..................................................... B60R 3/00
[52] U.S. Cl. ...................... 280/163; 280/164.1; 182/90; 296/62
[58] Field of Search ................... 280/163, 164.1, 280/164.2, 291, 166; 293/115, 116, 117; 182/127, 90, 91; 296/62; 105/430, 431

[56] References Cited

U.S. PATENT DOCUMENTS

| | | |
|---|---|---|
| 7,591 | 8/1850 | Burdett . |
| D. 267,166 | 12/1982 | Sambucetti et al. . |
| 2,220,035 | 10/1940 | Brack ..................................... 105/430 |
| 2,544,799 | 3/1951 | McCann . |
| 2,546,626 | 3/1951 | Beezhold ................................ 105/430 |
| 2,660,454 | 11/1953 | Coumerilh ............................... 280/163 |
| 2,779,525 | 1/1957 | Vogel . |
| 3,708,198 | 1/1973 | Coons . |
| 3,858,905 | 1/1975 | Peebles . |
| 4,266,817 | 5/1981 | Mason et al. . |
| 4,541,661 | 9/1985 | Hawk ............................... 280/164.1 X |
| 5,070,794 | 12/1991 | Kunst et al. ......................... 280/166 X |
| 5,617,930 | 4/1997 | Elia ................................. 280/164.1 X |

*Primary Examiner*—Lee W. Young
*Assistant Examiner*—Pamela J. Lipka
*Attorney, Agent, or Firm*—Dorsey & Whitney LLP

[57] ABSTRACT

A vehicle having a horizontal transport platform or bed with steps mounted within the horizontal platform. The vehicle comprises a horizontal platform supported three to four feet above ground by wheels. The platform is reinforced by longitudinal I-beams. In accordance with the present invention, a rectangular opening is provided at the rear of the platform. The opening is positioned between adjacent longitudinal I-beams. The opening contains one or more steps that descend from the level of the horizontal platform to just above ground level. The steps are within the perimeter of the platform. To maximize transport area on the horizontal platform, a cover is provided for the platform opening. The cover is attached by a hinge along one side of the rectangular opening in the horizontal platform.

20 Claims, 6 Drawing Sheets

STAIRWAY FOR FLATBED VEHICLES

CROSS-REFERENCE TO RELATED APPLICATION

This application is a non-provisional application related to a provisional application by the same title filed Feb. 6, 1996 and assigned Ser. No. 60/011,230.

BACKGROUND OF THE INVENTION

1. Field of the Invention:

This invention relates to tractor trailer beds, truck beds and the like, and more particularly to a vehicle having a horizontal transport platform or bed with steps mounted within the horizontal platform.

2. Related Prior Art:

Horizontal transport platforms on vehicles are well-known. Examples of these include city trucks, the trailer portion of semi-trucks and various forms of tow behind trailers. In each of these cases, platform height is determined by wheel diameter. In some instances, wheel diameter may be on the order of four feet, in which instance the platform height exceeds four feet. These high platforms make it difficult to load and unload materials from the platform. In addition, as platform height increases, there is a danger of cars sliding under the rear of the platform and possibly decapitating the operator of the vehicle. Various solutions to these problems have been advanced in the prior art.

A first category of solutions involves external steps fixed permanently to the rear of the platform. U.S. Pat. No. 4,266,817 issued on May 12, 1981, to James L. Mason and entitled *Rear Step Bumper*; U.S. Pat. No. 2,660,454 issued on Nov. 24, 1953, to Counerilth and entitled *Combined Rear Trailer Bumper and Step*; U.S. Pat. No. 3,708,198 issued on Jan. 2, 1973, to Coons and entitled *Convertible Trailer Porch and Camper*; and Design Pat. No. 267,166 issued on Dec. 7, 1982, to Sambucetti et al and entitled *Semi-Trailer* all disclose external fixed steps. The steps are rigidly attached to the rear portion of a horizontal platform on, respectively, a pick-up truck bumper, a city truck, a trailer porch, and a trailer. Each of these patents disclose a means for providing access to an elevated transport platform, but require that the overall length of the vehicle be increased in order to provide this access.

A second category of prior art patents solve the problem of platform access without adding length to a transport platform. They do this by adding a retractable set of steps to the transport platform. The steps and the retraction thereof, however, are a complex and expensive addition to the platform. Examples of this teaching are U.S. Pat. No. 3,858,905 issued on Jan. 7, 1975, to Peebles and entitled *Demountable Safety Ladder With Handrail*; U.S. Pat. No. 2,779,525 issued on Jan. 29, 1957, to Vogel and entitled *Truck Extension Ladder*; U.S. Pat. No. 2,544,799 issued on Mar. 13, 1951, to McCann entitled *Yielding Vehicle Step*; and U.S. Pat. No. 7,591 issued on Aug. 27, 1850, to Burdett and entitled *Carriage Step*. Each of these patents disclose retractable steps in the rear portion of, respectively, a house trailer, a city delivery vehicle and a carriage. The problem with these steps is that they are expensive and difficult to manufacture, require labor each time they are used to retract and deploy them, and the steps can be damaged due to their flexible design.

There remains a need for providing access to transport platforms without increasing the length of the platform or the expense, complexity and labor associated with retractable steps.

SUMMARY OF THE INVENTION

The present invention in general terms provides a vehicle having a horizontal transport platform or bed with steps mounted within but beneath the horizontal platform. The steps provide easy access to the platform for loading and unloading and help prevent cars from sliding under the rear of the horizontal platform. The present invention, by way of example, may be adapted to city trucks, the trailer portion of semi-trucks and various forms of tow behind trailers.

Typically a horizontal platform of such a vehicle will be supported three to four feet above ground by wheels of approximately that same diameter. The platform is reinforced by longitudinal I-beams. In accordance with the present invention, a rectangular opening is provided at the rear of the platform. The opening is positioned between adjacent longitudinal I-beams. The opening contains one or more steps that descend from the level of the horizontal platform to just above ground level. The steps are within the perimeter of the platform, and do not extend beyond the rear of the platform, therefore, vehicle length is not increased.

In order to maximize transport area on the horizontal platform, a cover is provided for the platform opening. The cover is attached by a hinge along one side of the rectangular opening in the horizontal platform. In a closed position the cover extends over the opening. The cover is provided with a latch. When the cover latch is released, the cover can be lifted to the open position, thereby providing access to the step(s).

The step(s) themselves are joined by vertical walls between each adjacent step. The walls serve two purposes. First, they prevent the foot of the person ascending the step(s) from slipping. Second, they serve as an anchoring point for brake and tail lights and license plate(s). To secure the step(s) and to prevent cars from sliding under the rear of the platform, a vertical U-shaped undercarriage guard brackets the opening in the horizontal platform. The undercarriage guard is welded to the underside of the horizontal platform. The lowest step bridges the two sides of the undercarriage guard and is secured to that guard. Finally, a handrail extends on either side of the step(s) from the undercarriage guard to the level of the horizontal platform.

Other aspects, features and details of the present invention can be more completely understood by reference to the following detailed description of a preferred embodiment taken in conjunction with the drawings and from the appended claims.

DESCRIPTION OF THE PREFERRED EMBODIMENT

The present invention in general terms provides a vehicle having a horizontal transport platform or bed with steps mounted within but beneath the horizontal platform. The steps provide easy access to the platform for loading and unloading and help prevent cars from sliding under the rear of the horizontal platform. The present invention, by way of example, may be adapted to closed-in truck bodies 20 as best shown in FIG. 3, the trailer portion of semi-trucks 22 as best shown in FIGS. 1 and 2 as well as various forms of tow-behind trailers.

Figure 1:
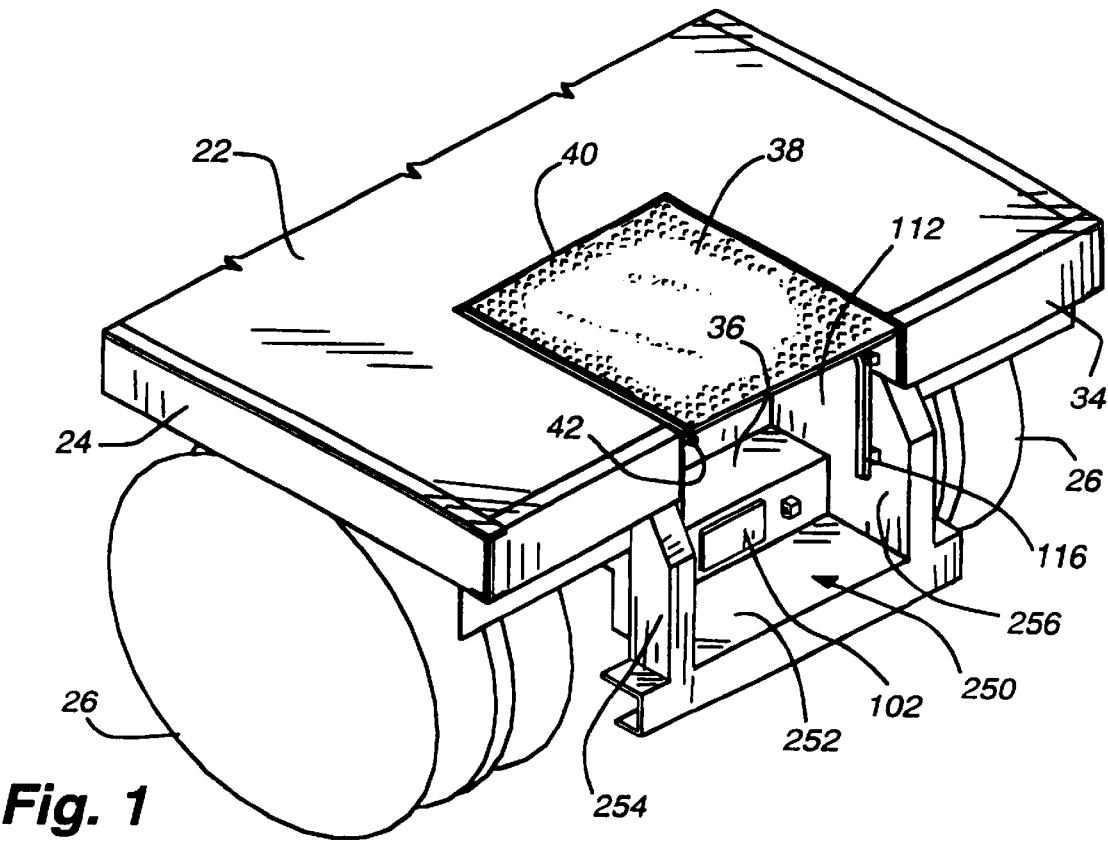
FIG. 1 is a fragmentary isometric of the rear end of a flatbed trailer showing the steps of the current invention with the cover in the closed position.
Figure 6:
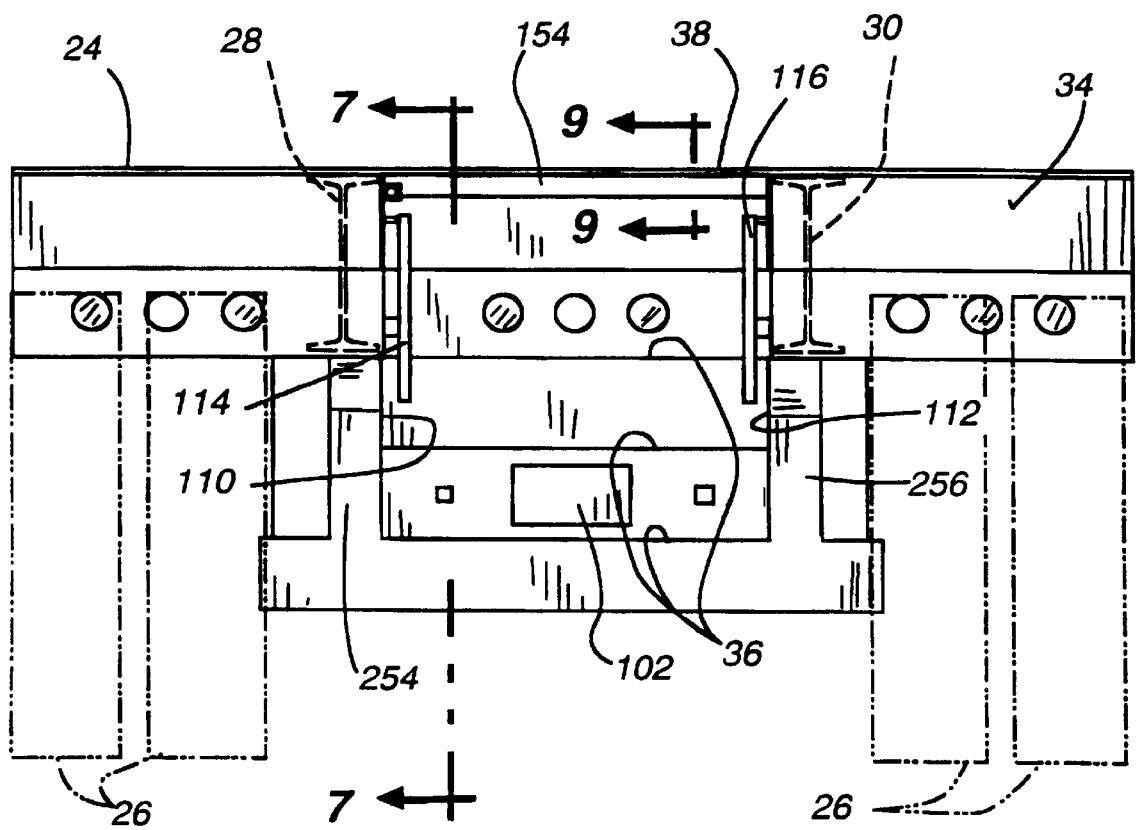
FIG. 6 is a rear elevation of the flatbed trailer as shown in FIG. 1 showing steps and cover in the closed position and with the wheels shown in phantom lines.

Typically, a horizontal platform 24 of such vehicles will be supported, as shown in FIG. 1, three to four feet above ground by left and right rear wheels 26. The platform 24 is reinforced by longitudinal I-beams 28, 30 as best shown in FIG. 6. In accordance with the present invention, a rectangular opening 32, as best shown in FIG. 2, is provided at the rear portion 34 of the horizontal platform 24. The opening 32 is positioned between adjacent longitudinal I-beams 28, 30. The opening contains one or more steps 36 that descend from the level of the horizontal platform 24 to just above ground level. Steps are within the perimeter of the platform 24 and do not extend beyond the rear portion 34 of the platform. Vehicle length is not therefore increased.

Figure 2:
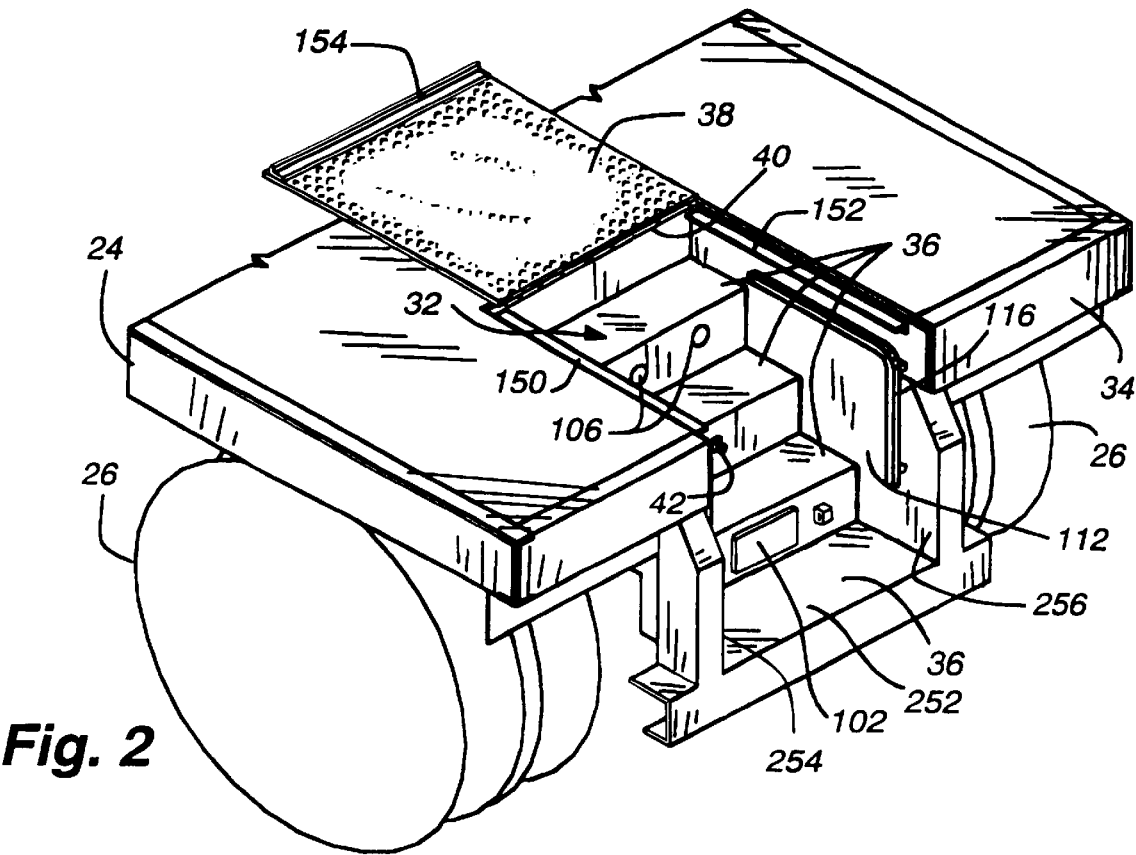
FIG. 2 is a fragmentary isometric of the rear end of a flatbed trailer similar to FIG. 1 showing the cover in the open position.
Figure 3:
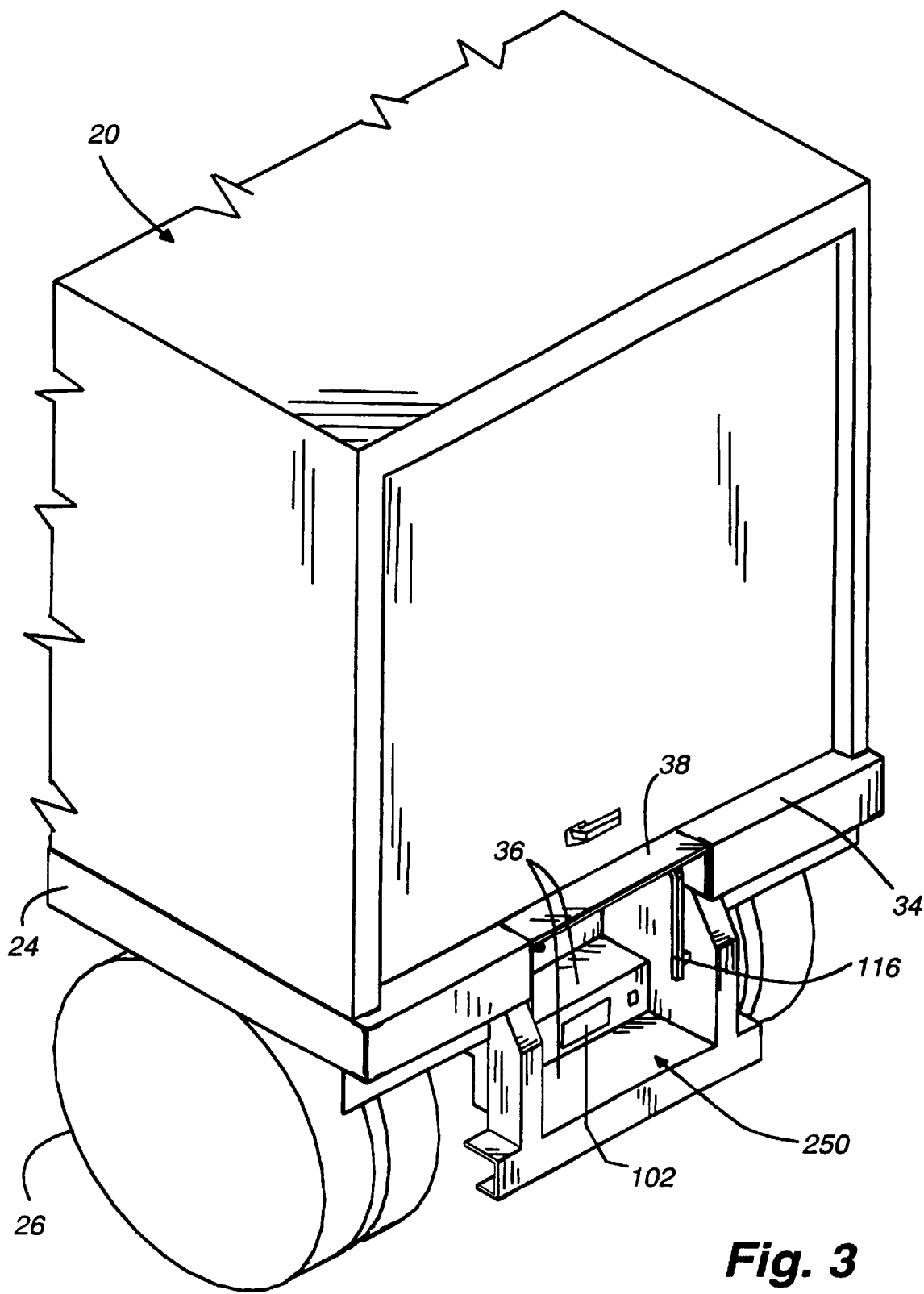
FIG. 3 is a fragmentary isometric of the rear end of a closed truck bed with a door extending over the steps and cover.
Figure 4:
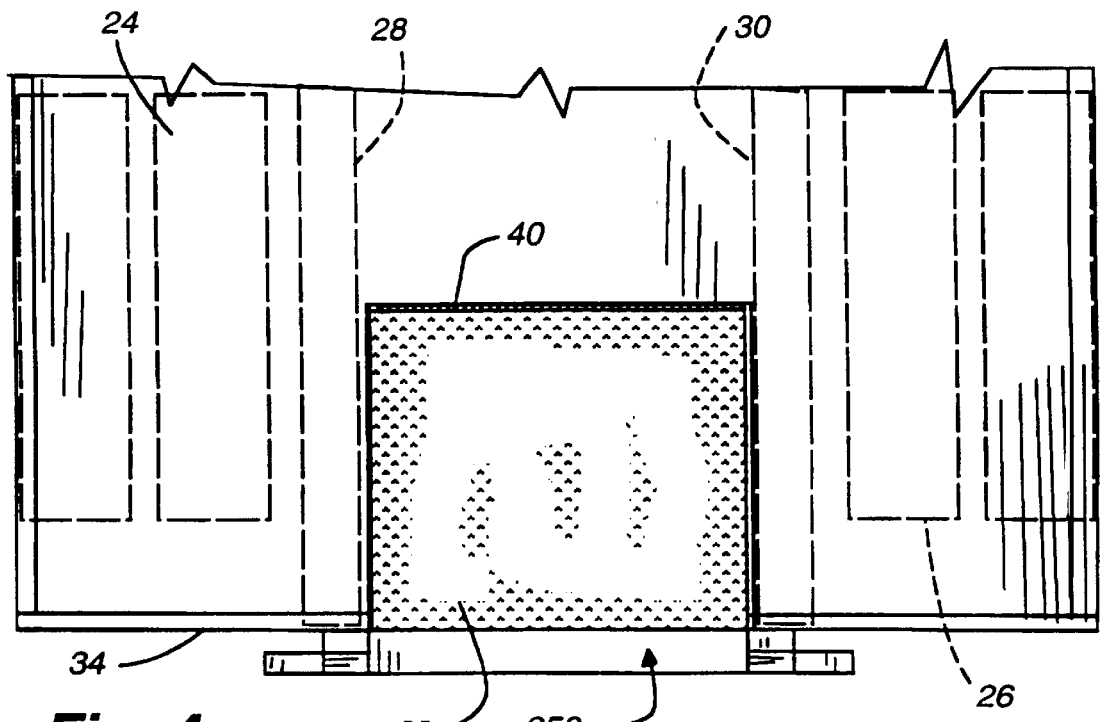
FIG. 4 is a fragmentary top plan of the rear end of a flatbed trailer showing the cover for the steps in the closed position.
Figure 5:
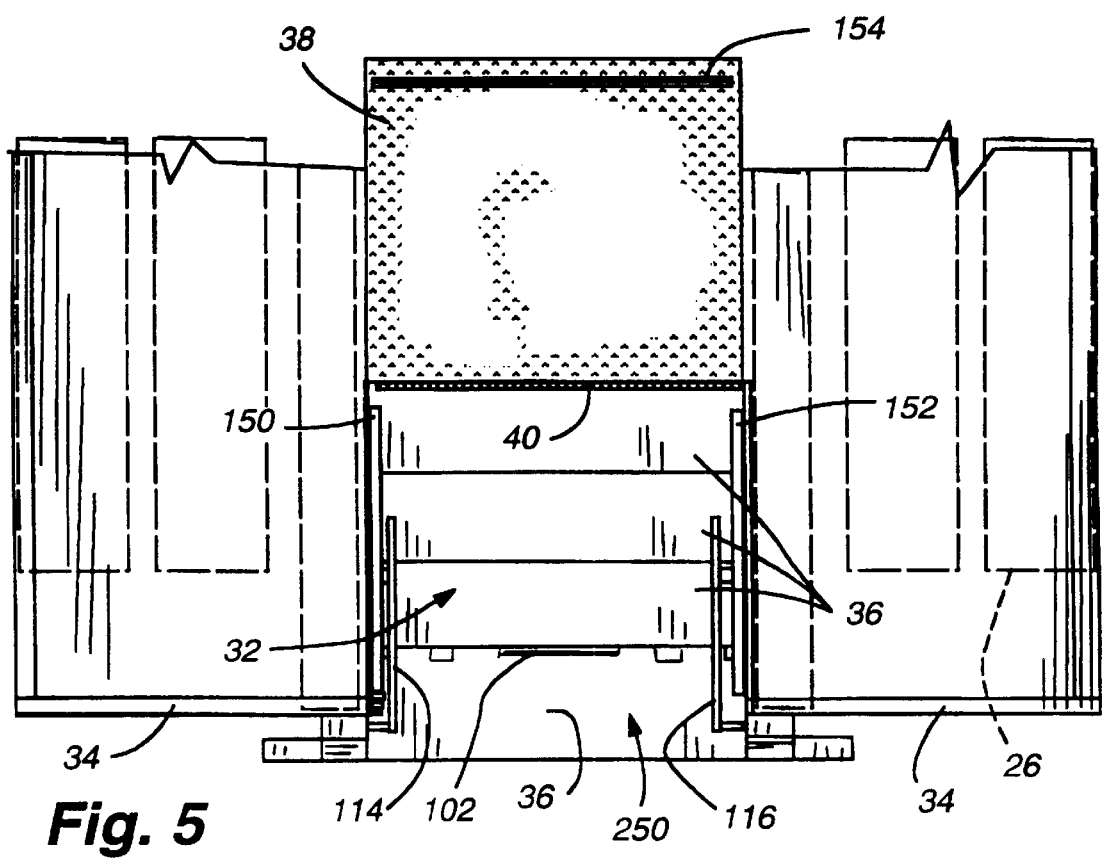
FIG. 5 is a fragmentary top plan view of the rear end of a flatbed trailer similar to FIG. 4 showing the cover in the open position.

In order to maximize transport area on the horizontal platform 24, a cover 38, as best shown in FIGS. 1 and 2, is provided for the platform opening 32. The cover is attached by a hinge 40 along one side of the rectangular opening 32 in the horizontal platform 24. In the closed position, as shown in FIG. 1, the cover extends over the opening. The cover is provided with a cover latch assembly 42. When the cover latch 42 is released, the cover can be lifted to the open position as shown best in FIG. 2, thereby providing access to the step(s) 36.

Figure 7:
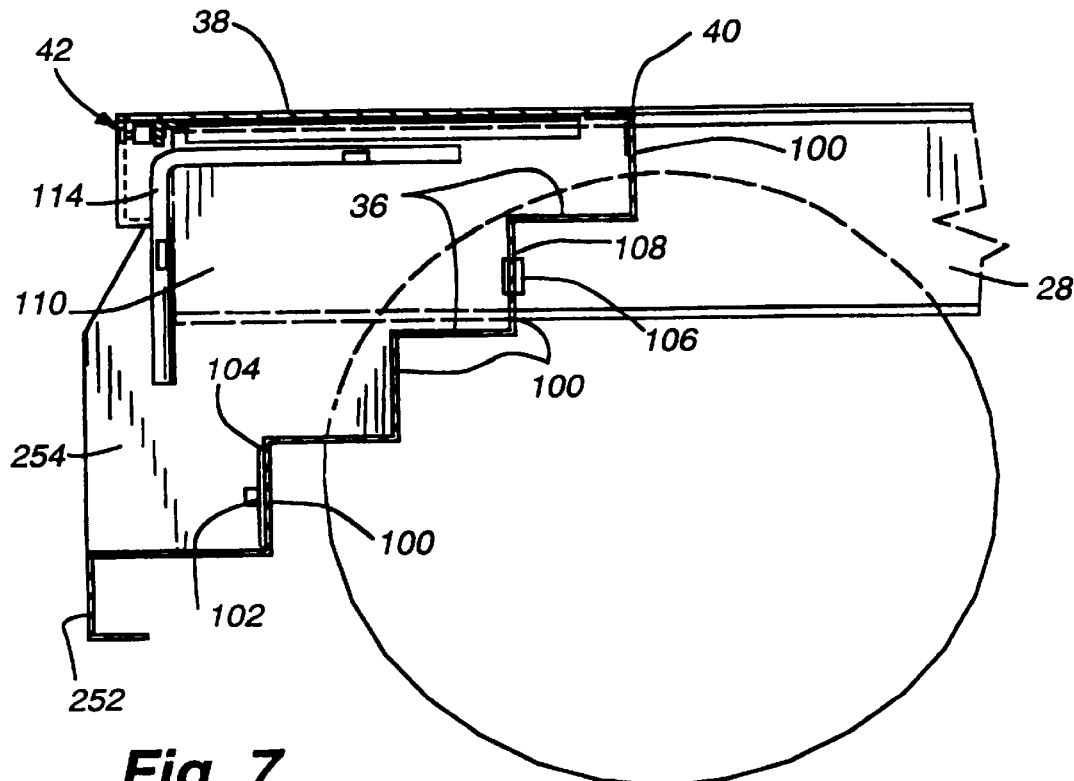
FIG. 7 is a fragmentary vertical cross-section taken along line 7—7 of FIG. 6.
Figure 8:
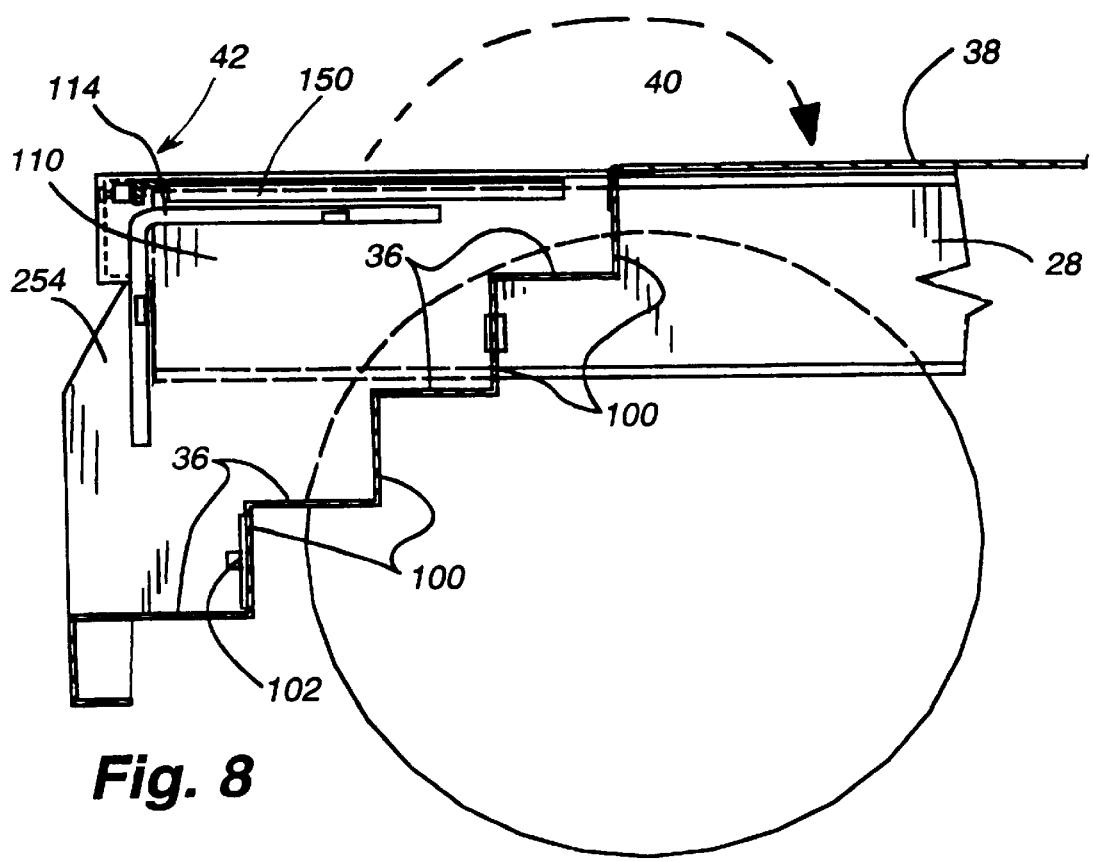
FIG. 8 is a fragmentary vertical cross-section similar to FIG. 7 with the cover in the open position.

Adjacent step(s) 36 are joined by vertical wall 100 as shown in greater detail in FIGS. 7 and 8. The vertical walls serve to prevent the foot of a person ascending step(s) 36 from slipping and also rigidifies the staircase comprised of step(s) 36 and vertical walls 100. Various vehicular identification devices and safety apparatus are placed on or within the vertical walls 100. As shown in FIG. 2, a tail light or license plate 102 is contained within an opening 104 defined within a vertical wall 100 between adjacent step(s) 36. Reflector lights 106 are anchored to wall 100 within openings 108.

The step(s) 36 and vertical walls 100 extend between sidewalls 110 and 112 as shown in FIG. 6. The steps and vertical walls bridge the space between the two sidewalls and are fastened orthogonally to those sidewalls by methods well-known in the prior art, including welding. The sidewalls 110, 112 are fastened respectively to the sides of I-beams 28, 30. This assembly provides a solid staircase for descending from the level of the horizontal platform 24 to ground level. To facilitate ascending or descending the step(s) 36, handrails 114, 116 are fastened to respectively sidewalls 110, 112 as shown in FIG. 6.

In the closed position the cover 38 rests on stop angles 150, 152 (FIG. 2) which are attached respectively to sidewalls 110, 112. The stop angles 150, 152 are mounted parallel to and just below the level of the horizontal platform 24 and extend from adjacent either end of hinge 40 along each side of the opening 32 to the rear of the platform. When cover 38 is moved to a closed position, it rests on these stop angles and transfers whatever weight may be placed on it in the way of cartons or pallets from the cover 38 to the stop angles 150, 152. The cover thus serves as a useful portion of the horizontal platform 24 for storage of articles being transported.

Figure 9:
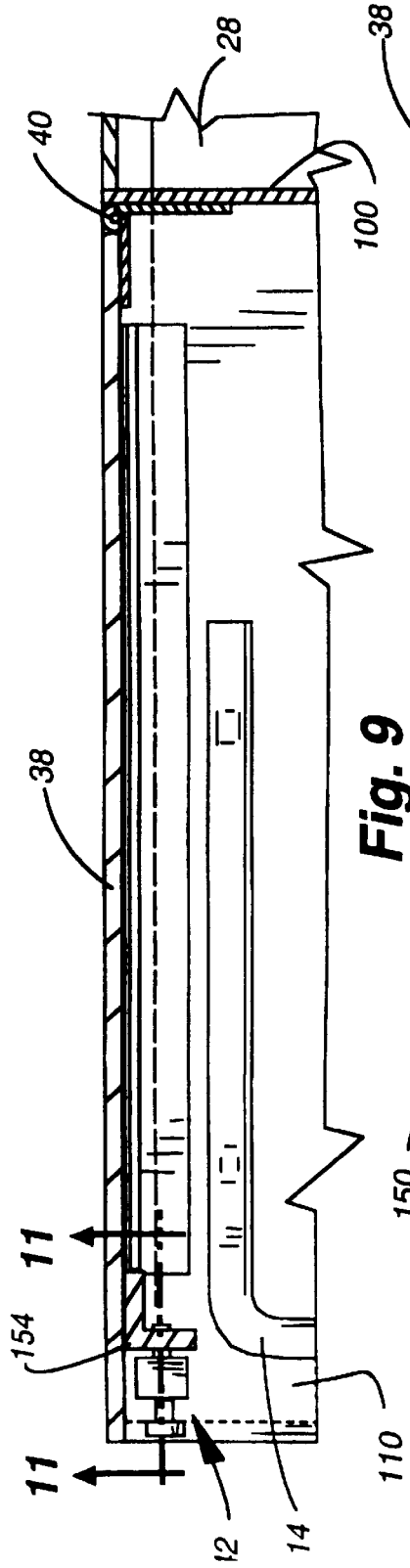
FIG. 9 is an enlarged fragmentary vertical cross-section taken along line 9—9 of FIG. 6.
Figure 10:
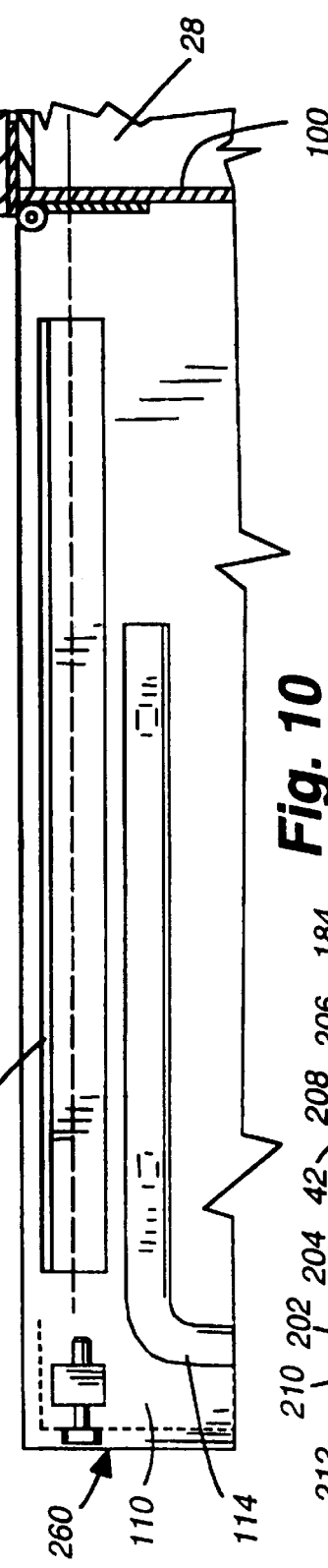
FIG. 10 is an enlarged fragmentary vertical cross-section similar to FIG. 9 showing the cover in the open position.

As shown in FIGS. 9 and 10, hinge 40 is attached to the uppermost one of vertical walls 100 and to the underside of cover plate 38 along a side of rectangular opening 32. On the side of cover 38 opposite the hinge, is a cover latch angle 154. The cover latch angle 154 is attached to the underside of cover plate 38 and welded thereto. Two functions are served by the latch angle. First, it serves to rigidify the cover plate so that it is capable of serving as a useful transport portion of the horizontal platform 24. Second, it serves as an engagement point by which the cover latch assembly 42 can secure the cover 38 in the closed position. In the engaged latch position, cover plate 38 is held level with platform 24 in the closed position. In the disengaged latch position, cover plate 38 can be pivotally opened about hinges 40 to allow the use of the step(s) 36.

Figure 11:
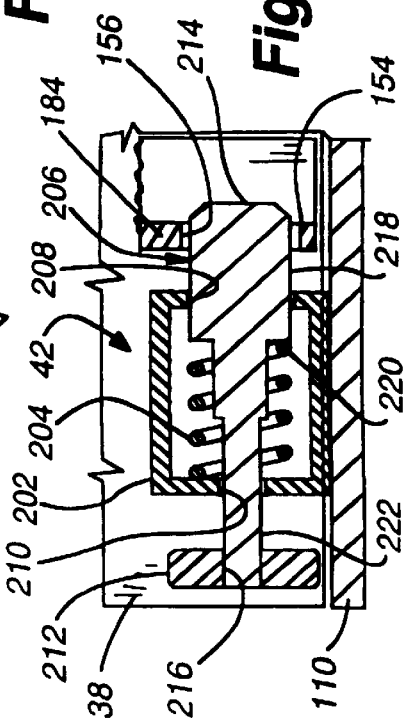
FIG. 11 is an enlarged fragmentary horizontal cross-section taken along line 11—11 of FIG. 9.

Latch assembly 42 is shown in greater detail in FIG. 11. The latch consists of a hollow rectangular latch housing 202, a compression spring 204 contained within the housing 202 coaxial with a longitudinal axis of the housing, and a latch pin assembly 206 coaxial with the longitudinal axis of the housing and with spring 204 and extending through holes 208 and 210 in opposing ends of housing 202. The housing 202 is welded along its side to I-beam 28.

The latch pin assembly 206 comprises a disc shaped handle 212 and a dual diameter pin 214. The disc-shaped handle has a center hole 216 concentric with the disc. The dual diameter pin 214 has a large diameter latch portion 218 joined by a shoulder portion 220 to a narrow diameter handle portion 222. Handle portion 222 protrudes through hole 210 in the latch housing 202. The handle portion 222 is received and anchored within center hole 216 of the disc shaped handle 212 to facilitate assemblage of the latch. Housing hole 210 through which handle portion 222 passes is dimensioned larger than the diameter of handle portion 222 and smaller than the diameter of spring 204. Spring 204 surrounds narrow handle portion 222 and is abutted at one end against the portion of housing 202 adjacent hole 210, and at the other end against shoulder portion 220. Large diameter latch portion 218 is biased by the spring into an engaged position extending from housing hole 208. When handle 212 is pulled away or retracted from housing 202, the spring 204 is compressed between shoulder 220 and housing 202 and the large diameter latch portion 218 is moved into a disengaged position retracted within hole 208. In the engaged position latch portion 218 locks down cover 38 by extending into a hole 156 within cover latch angle 154.

In order to prevent cars from sliding under the rear portion 34 of horizontal platform 24, an undercarriage guard 250 as shown in FIGS. 1 and 2 is provided. The undercarriage guard is comprised of a horizontal base portion 252 and left 254 and right 256 struts. The base portion forms the lowest step of the above-mentioned staircase. The base portion, however, is wider than the other step(s) 36 and is located vertically below the rear portion 34 of the horizontal platform and above ground level. The bottom of left and right struts are rigidly attached to the top of the horizontal base portion 252 at either end. The top of the left and right struts are attached to the underside of the rear portion 34 of horizontal platform 24. The undercarriage guard thereby forms an entry to step(s) 36. To increase the ability of the undercarriage guard to sustain a collision from the rear, the base 252 is welded to the lowermost one of vertical walls 100. The left and right struts 254, 256 are welded to sidewalls 110 and 112 respectively.

Although the present invention has been described with a certain degree of particularity, it is understood that changes in detail or structure may be made without departing from the spirit of the invention as defined in the appended claims.

What is claimed is:

1. In a vehicle having a horizontal platform with wheels supporting the platform, the improvement comprising
   a perimeter portion of the horizontal platform defining a generally horizontal rectangular opening;
   at least one horizontal step positioned in said horizontal rectangular opening below the level of said horizontal platform;
   a vertical wall extending from said at least one horizontal step, wherein said vertical wall defines a tail light opening; and
   a tail light mounted within said tail light opening.

2. In a vehicle having a horizontal platform with wheels supporting the platform, the improvement comprising
   a perimeter portion of said horizontal platform defining a generally horizontal rectangular opening;
   longitudinal members supporting said horizontal platform, wherein said horizontal rectangular opening is positioned between said longitudinal members;
   a horizontal upper step positioned in said horizontal rectangular opening and attached between said longitudinal members below the level of said horizontal platform;
   a horizontal lower step joined to said horizontal upper step by at least one intermediate step;
   vertical walls joining adjacent ones of said upper, lower, and intermediate steps, wherein at least one of said vertical walls defines a tail light opening; and
   a tail light mounted within said tail light opening.

3. The vehicle of claim 2, further comprising a vertically disposed U-shaped undercarriage guard having spaced side portions attached to said platform therebeneath, and a base portion attached to said side portions and bridging the space between said side portions.

4. The vehicle of claim 2, further comprising a cover plate attached to said platform for movement between a covering and a noncovering position relative to said opening, said cover plate adapted to be flush with said horizontal platform in said covered position and to expose said horizontal upper step, said horizontal lower step, and said at least one intermediate step in said uncovered position.

5. In a vehicle having a horizontal platform with wheels supporting the platform, the improvement comprising
   a perimeter portion of the horizontal platform defining a generally horizontal rectangular opening;
   at least one horizontal step positioned in said horizontal rectangular opening below the level of said horizontal platform;
   a vertical wall extending from said at least one horizontal step, wherein said vertical wall defines a tail light opening;
   a tail light mounted within said opening; and
   a vertically-disposed, rigid U-shaped undercarriage guard rigidly attached to said horizontal platform therebeneath, said U-shaped undercarriage guard comprising a horizontal base portion, a left strut portion, and a right strut portion, wherein said left and right strut portions are rigidly attached to said horizontal base portion.

6. The vehicle of claim 5, further comprising a cover plate attached to said horizontal platform for movement between a covering and a noncovering position relative to said opening, said cover plate adapted to be flush with said horizontal platform in said covered position and to expose said at least one horizontal step in said uncovered position.

7. The vehicle of claim 5, wherein said vertically disposed U-shaped undercarriage guard brackets an opening to said at least one horizontal step, such that said at least one horizontal step descends in a direction perpendicular to a vertical plane containing said U-shaped undercarriage guard.

8. In a vehicle having a horizontal platform with wheels supporting the platform, the improvement comprising
   a perimeter portion of the horizontal platform defining a generally horizontal rectangular opening;
   at least one horizontal step positioned in said horizontal rectangular opening below the level of said horizontal platform;
   a vertical wall extending from said at least one horizontal step, wherein said vertical wall defines an opening having a license plate mounted therein; and
   a vertically-disposed, rigid U-shaped undercarriage guard rigidly attached to said horizontal platform therebeneath, said U-shaped undercarriage guard comprising a horizontal base portion, a left strut portion, and a right strut portion, wherein said left and right strut portions are rigidly attached to said horizontal base portion.

9. The vehicle of claim 8, further comprising a cover plate attached to said horizontal platform for movement between a covering and a noncovering position relative to said opening, said cover plate adapted to be flush with said horizontal platform in said covered position and to expose said at least one horizontal step in said uncovered position.

10. The vehicle of claim 8, wherein said vertically disposed U-shaped undercarriage guard brackets an opening to said at least one horizontal step, such that said at least one horizontal step descends in a direction perpendicular to a vertical plane containing said U-shaped undercarriage guard.

11. In a vehicle having a horizontal platform with wheels supporting the platform, the improvement comprising
   a perimeter portion of the horizontal platform defining a generally horizontal rectangular opening;
   longitudinal members supporting said horizontal platform, wherein said horizontal rectangular opening is positioned between said longitudinal members;
   an upper step and a lower step, each positioned in said horizontal rectangular opening below the level of said horizontal platform, wherein said upper and lower steps are joined by intermediate steps, and wherein said upper step is attached between said longitudinal members below the level of said horizontal platform;
   vertical walls joining adjacent ones of said upper, lower, and intermediate steps, wherein at least one of said vertical walls defines a tail light opening, and further wherein a tail light is mounted within said tail light opening; and a vertically-disposed, rigid U-shaped undercarriage guard rigidly attached to said horizontal platform therebeneath, said U-shaped undercarriage guard comprising a horizontal base portion, a left strut portion, and a right strut portion, wherein said left and right strut portions are rigidly attached to said horizontal base portion.

12. The vehicle of claim 11, further comprising a cover plate attached to said horizontal platform for movement between a covering and a noncovering position relative to said opening, said cover plate adapted to be flush with said horizontal platform in said covered position and to expose said upper, lower, and intermediate steps in said uncovered position.

13. In a vehicle having a horizontal platform supported by wheels, the improvement comprising a rear portion of said horizontal platform having a generally horizontal rectangular opening therein;

a horizontal upper step positioned in said horizontal rectangular opening and below the level of said horizontal platform; and a vertically disposed U-shaped undercarriage guard rigidly attached to said horizontal platform therebeneath, said U-shaped undercarriage guard comprising a horizontal base portion, a left strut portion, and a right strut portion, wherein each of said left and right strut portions has a top and a bottom, wherein said tops of said left and right strut portions are rigidly attached to an underside of said rear portion of said horizontal platform, and further wherein said bottoms of said left and right strut portions are rigidly attached to said horizontal base portion.

14. The vehicle of claim 13 further comprising at least one intermediate horizontal step between said horizontal upper step and said horizontal base portion, and vertical walls, wherein said vertical walls join adjacent ones of said horizontal upper step, said at least one intermediate horizontal step, and said horizontal base portion.

15. The vehicle of claim 14, wherein said vertically disposed U-shaped undercarriage guard brackets an opening to said horizontal upper step, said at least one intermediate horizontal step, and said horizontal base portion, such that said horizontal upper step, said at least one intermediate horizontal step, and said horizontal base portion descend in a direction perpendicular to a vertical plane containing said U-shaped undercarriage guard.

16. The vehicle of claim 14, wherein said horizontal rectangular opening comprises spaced sidewalls attached to an underside of said horizontal platform and attached to a top side of said horizontal base portion.

17. The vehicle of claim 16, further comprising handrails attached to said sidewalls.

18. The vehicle of claim 16, further comprising a cover plate attached to said horizontal platform for movement between a covering and a noncovering position relative to said opening, said cover plate adapted to be flush with said horizontal platform in said covered position and to expose said horizontal upper step, said at least one intermediate step, and said horizontal base portion in said uncovered position.

19. The vehicle of claim 18, further comprising a hinge joining said cover plate to said horizontal platform, and a cover latch assembly operatively associated with said cover plate.

20. The vehicle of claim 13, further comprising longitudinal members supporting said horizontal platform, wherein said horizontal rectangular opening is positioned between said longitudinal members, and wherein said horizontal upper step is attached between said longitudinal members.

* * * * *